(12) United States Patent
Nomura et al.

(10) Patent No.: US 11,566,559 B2
(45) Date of Patent: Jan. 31, 2023

(54) PRECOMBUSTION CHAMBER GAS ENGINE

(71) Applicant: MITSUBISHI HEAVY INDUSTRIES ENGINE & TURBOCHARGER, LTD., Sagamihara (JP)

(72) Inventors: Kazutoshi Nomura, Tokyo (JP); Daisuke Takemoto, Tokyo (JP); Satoshi Yamada, Tokyo (JP); Akihiro Yuuki, Tokyo (JP); Shunya Sasaki, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

(21) Appl. No.: 17/472,040

(22) Filed: Sep. 10, 2021

(65) Prior Publication Data
US 2021/0404373 A1    Dec. 30, 2021

Related U.S. Application Data

(62) Division of application No. 16/466,553, filed as application No. PCT/JP2017/043202 on Nov. 30, 2017, now Pat. No. 11,143,092.

(30) Foreign Application Priority Data

Dec. 8, 2016    (JP) ................................ 2016-238753

(51) Int. Cl.
*F02B 19/18*    (2006.01)
*F02B 19/10*    (2006.01)
(Continued)

(52) U.S. Cl.
CPC .............. *F02B 19/18* (2013.01); *F02B 19/10* (2013.01); *F02B 19/12* (2013.01); *F02B 19/16* (2013.01); *F02M 21/02* (2013.01)

(58) Field of Classification Search
CPC .......... F02B 19/18; F02B 19/10; F02B 19/12; F02B 19/16; F02B 19/1004;
(Continued)

(56) References Cited

U.S. PATENT DOCUMENTS 4,066,045 A * 1/1978 Suzuki ................... F02B 19/12
                                                      123/260
4,098,232 A * 7/1978 Gleiter ................ F02B 19/1004
                                                      123/286
(Continued)

FOREIGN PATENT DOCUMENTS

CN    101858245 A    10/2010
EP    2 520 780 A1   11/2012
(Continued)

OTHER PUBLICATIONS

Decision of Refusal dated Jun. 23, 2020 issued in counterpart Japanese application No. 2016-238753.
(Continued)

*Primary Examiner* — Xiao En Mo
(74) *Attorney, Agent, or Firm* — Birch, Stewart, Kolasch & Birch, LLP

(57) ABSTRACT

A precombustion chamber gas engine includes a main-chamber forming portion forming a main combustion chamber, a precombustion-chamber forming portion forming a precombustion chamber communicating with the main combustion chamber via a plurality of nozzle holes, and an ignition device disposed in the precombustion chamber and having an ignition portion spaced from a main chamber central axis of the main combustion chamber at a predetermined distance. In a plan view, the precombustion chamber has a near-ignition region including the ignition portion and a far-ignition region opposite to the near-ignition region separated by a borderline passing through a precombustion chamber central axis of the precombustion chamber and
(Continued)

perpendicular to a straight line passing through the precombustion chamber central axis and the ignition portion. The distance between the precombustion chamber central axis and a precombustion-chamber-side opening end, connected to the precombustion chamber, of a specific far nozzle hole which is at least one nozzle hole in the far-ignition region is shorter or longer than the distance between the precombustion chamber central axis and a precombustion-chamber-side opening end of a specific near nozzle hole which is at least one nozzle hole in the near-ignition region.

3 Claims, 9 Drawing Sheets

(51) Int. Cl.
  *F02B 19/12* (2006.01)
  *F02B 19/16* (2006.01)
  *F02M 21/02* (2006.01)

(58) Field of Classification Search
  CPC .............. F02B 19/1014; F02B 19/1019; F02B 19/108; F02M 21/02; F02M 21/0218; F02M 21/0248; F02M 21/0281
  See application file for complete search history.

(56) References Cited

U.S. PATENT DOCUMENTS

| | | | | |
|---|---|---|---|---|
| 4,124,000 | A * | 11/1978 | Genslak | F02B 3/00 |
| | | | | 123/295 |
| 4,250,852 | A * | 2/1981 | Abulkasim ogly Kerimov | ......... |
| | | | | F02B 19/108 |
| | | | | 123/260 |
| 4,369,746 | A * | 1/1983 | Thring | F02B 51/02 |
| | | | | 123/263 |
| 4,719,884 | A * | 1/1988 | Shinno | F02B 19/12 |
| | | | | 123/262 |
| 5,024,193 | A | 6/1991 | Graze, Jr. | |
| 5,566,654 | A * | 10/1996 | Masuda | F02B 19/165 |
| | | | | 123/271 |
| 5,769,050 | A * | 6/1998 | Ito | F02B 19/08 |
| | | | | 123/286 |
| 9,200,559 | B2 | 12/2015 | Ishii et al. | |
| 10,077,708 | B2 | 9/2018 | Furukawa | |
| 10,961,899 | B2 | 3/2021 | Suzuki | |
| 2004/0060536 | A1 | 4/2004 | Funaki et al. | |
| 2006/0219210 | A1 | 10/2006 | Bailey et al. | |
| 2008/0168963 | A1 * | 7/2008 | Gagliano | F02B 19/1014 |
| | | | | 123/267 |
| 2011/0146618 | A1 | 6/2011 | LaPointe et al. | |
| 2012/0103302 | A1 | 5/2012 | Attard | |
| 2013/0000598 | A1 | 1/2013 | Tokuoka et al. | |
| 2014/0060479 | A1 | 3/2014 | Tozzi | |
| 2015/0184578 | A1 | 7/2015 | Oda et al. | |
| 2016/0003117 | A1 | 1/2016 | Cook | |
| 2016/0230646 | A1 | 8/2016 | Kim | |
| 2016/0252010 | A1 | 9/2016 | Villeneuve et al. | |
| 2017/0138251 | A1 | 5/2017 | Watanabe et al. | |
| 2017/0145899 | A1 | 5/2017 | Singh | |
| 2017/0167359 | A1 | 6/2017 | Maier | |
| 2017/0306917 | A1 | 10/2017 | Kim | |
| 2017/0314456 | A1 | 11/2017 | Blaxill et al. | |
| 2019/0323416 | A1 | 10/2019 | Nomura et al. | |
| 2019/0368410 | A1 | 10/2019 | Takemoto | |
| 2020/0036166 | A1 | 1/2020 | Kuhnert | |
| 2020/0080467 | A1 * | 3/2020 | Nomura | F02B 19/1004 |
| 2020/0165961 | A1 | 5/2020 | Hamada et al. | |
| 2020/0332705 | A1 | 10/2020 | Han et al. | |
| 2020/0392892 | A1 | 12/2020 | Fiveland et al. | |

FOREIGN PATENT DOCUMENTS

| | | | |
|---|---|---|---|
| EP | 2927458 A1 | | 10/2015 |
| JP | 2001-3753 A | | 1/2001 |
| JP | 2001003753 A | * | 1/2001 |
| JP | 2001-227344 A | | 8/2001 |
| JP | 4975092 B2 | | 7/2012 |
| JP | 2012-149655 A | | 8/2012 |
| JP | 2014-62484 A | | 4/2014 |
| JP | 2014-129788 A | | 7/2014 |
| JP | 2016-3608 A | | 1/2016 |

OTHER PUBLICATIONS

Extended European Search Report for European Application No. 17877701.7, dated Jan. 17, 2020.
International Preliminary Report on Patentability and Written Opinion of the International Searching Authority, dated Jun. 20, 2019, for International Application No. PCT/JP2017/043202, with an English Translation of the Written Opinion.
International Search Report, dated Feb. 20, 2018, for International Application No. PCT/JP2017/043202.
Office Action dated Apr. 14, 2020 issued in counterpart Japanese Application No. 2016-238753 with an English Translation.
Office Action dated Sep. 17, 2020 issued in counterpart European Patent Application No. 17877701.7.
Partial Supplementary European Search Report, dated Oct. 21, 2019, for European Application No. 17877701.7.

* cited by examiner

PRECOMBUSTION CHAMBER GAS ENGINE

CROSS-REFERENCE TO RELATED APPLICATIONS

This application is a Divisional Application of co-pending application Ser. No. 16/466,553, filed Jun. 4, 2019, which is a National Phase under 35 U.S.C. § 371 of International Application No. PCT/JP2017/043202, filed Nov. 30, 2017, which claims the benefit under 35 U.S.C. § 119(a) to Patent Application No. 2016-238753, filed in Japan on Dec. 8, 2016, all of which are hereby expressly incorporated by reference into the present application.

TECHNICAL FIELD

The present disclosure relates to a precombustion chamber gas engine for combusting an air-fuel mixture in a main combustion chamber (main chamber) by injecting a combustion flame generated in a precombustion chamber (auxiliary chamber) via a plurality of nozzle holes to the main combustion chamber.

BACKGROUND ART

A precombustion chamber gas engine is conventionally known as an engine enabling efficient combustion of a lean premixed gas (for instance, Patent Documents 1 and 2). The precombustion chamber gas engine includes a main combustion chamber (main chamber) defined between a piston and a cylinder head and a precombustion chamber disposed adjacent to the main combustion chamber, for instance above the cylinder. The main combustion chamber communicates with the precombustion chamber via a plurality of nozzle holes. By igniting an air-fuel mixture in the precombustion chamber by an ignition device such as an ignition plug, a combustion flame is generated and jetted via each of the nozzle holes disposed at a lower portion of the precombustion chamber, by which a lean premixed gas in the main combustion chamber is combusted. More specifically, a part of a lean premixed gas introduced into the cylinder during the intake stroke of the engine flows into the precombustion chamber via each of the nozzle holes during the compression stroke and is mixed with a precombustion chamber fuel supplied to the precombustion chamber to produce an air-fuel mixture having a concentration suitable for ignition in the precombustion chamber. The air-fuel mixture in this state is ignited by the ignition device, and the combustion flame thereof is injected from the precombustion chamber to the cylinder and serves as a torch to ignite and combust the lean premixed gas in the main combustion chamber. This allows combustion of the lean fuel in the main combustion chamber, thus enabling low fuel consumption. Further, since combustion of the lean mixed gas in the main combustion chamber is performed at a relatively low temperature, generation of NOx is reduced, and low pollution can be achieved.

In such a precombustion chamber gas engine, if the flow of mixed gas from the main chamber to the precombustion chamber via the nozzle holes becomes unstable, an air-fuel mixture having a concentration suitable for ignition is less likely to be formed around an ignition portion of the ignition device (e.g., electrode of ignition plug), which may cause unstable combustion in the precombustion chamber. To solve the above problem, on the basis of findings that the shape of the nozzle hole affects the stability of the flow of mixed gas to be introduced into the precombustion chamber, Patent Document 1 defines the shape of a throat (small-diameter cylinder chamber described later) of the precombustion chamber and the shape of a round-chamfered portion along a rim of a throat-side opening end of the nozzle hole to suppress combustion fluctuation.

Further, as described above, since the air-fuel mixture in the main combustion chamber is ignited by the combustion flame (torch jet) injected from the precombustion chamber to the main combustion chamber via each of the nozzle holes at the combustion stroke, variation of flame propagation of combustion flame of the air-fuel mixture in the main combustion chamber may cause abnormal combustion such as knocking. To solve the above problem, on the basis of findings that the variation of flame propagation speed in the main combustion chamber is caused when the temperature of a cylinder wall surface in an intake region where an intake port is located is lower than the temperature of a cylinder wall surface in an exhaust region where an exhaust port is located, Patent Document 2 discloses that the sum of nozzle hole areas of intake-side nozzle holes disposed in the intake region is made larger than the sum of nozzle hole areas of exhaust-side nozzle holes disposed in the exhaust region. This intends to shorten the time for the flame of an intake-side air-fuel mixture ignited by the torch jet from the intake-side nozzle holes to reach the cylinder wall surface, in order to suppress the occurrence of knocking.

CITATION LIST

Patent Literature

Patent Document 1: JP2016-3608A
Patent Document 2: JP2014-62484A

SUMMARY

Problems to be Solved

An ignition device (ignition portion) of the precombustion chamber is occasionally difficult to be disposed on the central axis of a cylinder for structure reasons of the precombustion chamber, and thus is disposed away from the central axis of the cylinder in some cases (see FIG. 1 described later). In such cases, the present inventors have found that, in the precombustion chamber, flame propagation of the combustion flame on the side adjacent to the ignition device is relatively faster than flame propagation on the opposite side away from the ignition device. Generally, nozzle holes of the precombustion chamber are formed at an equal interval in a plan view, and more unburned gas tends to leak from the precombustion chamber to the main combustion chamber via a nozzle hole which the combustion flame have reached more behind. Consequently, injection start timing and injection strength of the torch jet vary between the nozzle holes, and ignition timing of a lean premixed gas in the main combustion chamber ignited by the torch get from each of the nozzle holes and flame propagation (e.g., flame propagation speed) of the combustion flame also vary accordingly. The variation of flame propagation in the main combustion chamber causes unburned gas to remain in a region where flame propagation of the combustion flame delays, which may cause knocking and degrade thermal efficiency and output power of a gas engine.

In view of the above, an object of at least one embodiment of the present invention is to provide a precombustion chamber gas engine capable of controlling the variation of flame propagation in a main combustion chamber.

Solution to the Problems (1) According to at least one embodiment of the present invention, a precombustion chamber gas engine comprises: a main-chamber forming portion forming a main combustion chamber; a precombustion-chamber forming portion forming a precombustion chamber communicating with the main combustion chamber via a plurality of nozzle holes; and an ignition device disposed at an upper portion of an interior of the precombustion chamber and having an ignition portion spaced from a main chamber central axis of the main combustion chamber at a predetermined distance. In a plan view, the precombustion chamber has a near-ignition region in which the ignition portion is disposed and a far-ignition region opposite to the near-ignition region separated by a borderline passing through a precombustion chamber central axis of the precombustion chamber and perpendicular to a straight line passing through the precombustion chamber central axis and the ignition portion. The plurality of nozzle holes includes a specific far nozzle hole which is at least one nozzle hole in the far-ignition region and a specific near nozzle hole which is at least one nozzle hole in the near-ignition region, and a distance between the precombustion chamber central axis and a precombustion-chamber-side opening end of the specific far nozzle hole connected to the precombustion chamber is shorter than a distance between the precombustion chamber central axis and a precombustion-chamber-side opening end of the specific near nozzle hole; or the plurality of nozzle holes includes a specific near nozzle hole which is at least one nozzle hole in the near-ignition region and a specific far nozzle hole which is at least one nozzle hole in the far-ignition region, and a distance between the precombustion chamber central axis and a precombustion-chamber-side opening end of the specific near nozzle hole connected to the precombustion chamber is shorter than a distance between the precombustion chamber central axis and a precombustion-chamber-side opening end of the specific far nozzle hole.

With the above configuration (1), in a plan view of the precombustion chamber of the precombustion chamber gas engine in which the ignition portion of the ignition device (e.g., electrode of ignition plug) is spaced from the central axis of the main combustion chamber (main chamber central axis) at a predetermined distance, the distance between the precombustion chamber central axis and the specific far nozzle hole in a region (ignition-far region) relatively away from the ignition portion is shorter than the distance between the precombustion chamber central axis and the specific near nozzle hole disposed in a region (ignition-near region) relatively close to the ignition portion. Alternatively, the distance between the precombustion chamber central axis and the specific near nozzle hole is shorter than the distance between the precombustion chamber central axis and the specific far nozzle hole. Here, the present inventors have found that the combustion flame produced by ignition by the ignition device reaches a precombustion-chamber-side opening end of a specific near nozzle hole, a portion (bottom center of precombustion chamber) through which the precombustion chamber central axis passes, and a precombustion-chamber-side opening end of a specific far nozzle hole in this order. Further, the present inventors have found that, by forming the precombustion-chamber-side opening end of the specific far nozzle hole adjacent to the bottom center of the precombustion chamber, it is possible to advance the timing at which the combustion flame produced by ignition by the ignition device reaches the precombustion-chamber-side opening end of the specific far nozzle hole. Conversely, the present inventors have found that, by forming the precombustion-chamber-side opening end of the specific near nozzle hole adjacent to the bottom center of the precombustion chamber, it is possible to delay the timing at which the combustion flame reaches the precombustion-chamber-side opening end of the specific near nozzle hole.

Thus, by bringing the precombustion-chamber-side opening end of the specific near nozzle hole or the specific far nozzle hole close to the bottom center of the precombustion chamber, it is possible to reduce the difference between timings at which the combustion flame produced in the precombustion chamber by ignition by the ignition device reaches the respective precombustion-chamber-side opening ends of the specific near nozzle hole and the specific far nozzle hole. Thereby, it is possible to adjust and equalize injection start timing and injection strength of combustion flames (torch jets) injected from respective main-chamber-side opening ends of the specific near nozzle hole and the specific far nozzle hole, and it is possible to suppress the variation of flame propagation in the main combustion chamber. Further, by suppressing the variation of flame propagation in the main combustion chamber, it is possible to suppress knocking caused by delay of flame arrival, and it is possible to improve the engine efficiency.

(2) In some embodiments, in the above configuration (1), the specific near nozzle hole is a nearest nozzle hole having a main-chamber-side opening end connected to the main combustion chamber and closest to the ignition portion among the plurality of nozzle holes in the near-ignition region in a plan view, and the specific far nozzle hole is a farthest nozzle hole having a main-chamber-side opening end farthest from the ignition portion among the plurality of nozzle holes in the far-ignition region in a plan view.

With the above configuration (2), in a plan view of the precombustion chamber, the distance between the precombustion chamber central axis and the precombustion-chamber-side opening end of the nozzle hole (farthest nozzle hole) having the main-chamber-side opening end farthest from the ignition portion is shorter than the distance between the precombustion chamber central axis and the precombustion-chamber-side opening end of the nozzle hole (nearest nozzle hole) having the main-chamber-side opening end closest to the ignition portion. Thereby, it is possible to adjust and advance the timing at which the combustion flame produced by ignition by the ignition device reaches the farthest nozzle hole. Thus, it is possible to bring injection start timing of the farthest nozzle hole close to injection start timing of the nearest nozzle hole which the combustion flame produced by ignition by the ignition device reaches earliest. Consequently, it is possible to suppress the variation of inject start timing at which the flame is injected to the main combustion chamber from each of the nozzle holes, and thus it is possible to efficiently suppress the variation of flame propagation in the main combustion chamber.

(3) In some embodiments, in the above configuration (1) or (2), the distance between the precombustion chamber central axis and the precombustion-chamber-side opening end of the specific far nozzle hole is shorter than an average of distances between the precombustion chamber central axis and respective precombustion-chamber-side opening ends of the plurality of nozzle holes.

With the above configuration (3), by making the distance between the precombustion chamber central axis and the precombustion-chamber-side opening end of the specific far nozzle hole shorter than the average, the distance between the precombustion chamber central axis and the precombustion-chamber-side opening end of the specific far nozzle hole is made shorter than the distance between the precombustion chamber central axis and the precombustion-chamber-side opening end of the specific near nozzle hole.

(4) In some embodiments, in the above configuration (1) or (2), the distance between the precombustion chamber central axis and the precombustion-chamber-side opening end of the specific near nozzle hole is shorter than an average of distances between the precombustion chamber central axis Cs and respective precombustion-chamber-side opening ends of the plurality of nozzle holes.

With the above configuration (4), by making the distance between the precombustion chamber central axis and the precombustion-chamber-side opening end of the specific near nozzle hole shorter than the average, the distance between the precombustion chamber central axis and the precombustion-chamber-side opening end of the specific near nozzle hole is made shorter than the distance between the precombustion chamber central axis and the precombustion-chamber-side opening end of the specific far nozzle hole.

(5) In some embodiments, in any one of the above configurations (1) to (4), an angle of depression of the specific far nozzle hole is equal to an angle of depression of the specific near nozzle hole.

With the above configuration (5), since the angle of depression of the specific far nozzle hole is equal to the angle of depression of the specific near nozzle hole, it is possible to reduce the difference between timings at which the combustion flame produced by ignition by the ignition device reaches the respective precombustion-chamber-side opening ends of the specific near nozzle hole and the specific far nozzle hole, while suppressing the influence on a time required for the combustion flame (torch jet) injected from each of the nozzle holes to propagate to an cylinder wall surface.

(6) According to at least one embodiment of the present invention, a precombustion chamber gas engine comprises: a main-chamber forming portion forming a main combustion chamber; a precombustion-chamber forming portion forming a precombustion chamber communicating with the main combustion chamber via a plurality of nozzle holes; and an ignition device disposed at an upper portion of an interior of the precombustion chamber and having an ignition portion spaced from a main chamber central axis of the main combustion chamber at a predetermined distance. In a plan view, the precombustion chamber has a near-ignition region in which the ignition portion is disposed and a far-ignition region opposite to the near-ignition region separated by a borderline passing through a precombustion chamber central axis of the precombustion chamber and perpendicular to a straight line passing through the precombustion chamber central axis and the ignition portion. The plurality of nozzle holes includes a specific far nozzle hole which is at least one nozzle hole in the far-ignition region and a specific near nozzle hole which is at least one nozzle hole in the near-ignition region, and a nozzle hole length of the specific far nozzle hole is shorter than a nozzle hole length of the specific near nozzle hole.

With the above configuration (6), in a plan view of the precombustion chamber of the precombustion chamber gas engine in which the ignition portion of the ignition device (e.g., electrode of ignition plug) is spaced from the central axis of the main combustion chamber (main chamber central axis) at a predetermined distance, the nozzle hole length of the specific far nozzle hole in a region (ignition-far region) relatively away from the ignition portion in a plan view of the precombustion chamber is shorter than the nozzle hole length of the specific near nozzle hole disposed in a region (ignition-near region) relatively close to the ignition portion. As the nozzle hole length increases, the combustion flame produced by ignition by the ignition device needs time to pass through the nozzle hole. Accordingly, in the precombustion chamber, by setting the nozzle hole length of the specific far nozzle hole which the combustion flame reaches later to be shorter than the nozzle hole length of the specific near nozzle hole which the combustion flame reaches earlier, it is possible to adjust and equalize injection start timing and injection strength of combustion flames (torch jets) injected to the main combustion chamber from the respective main-chamber-side opening ends of the specific far nozzle hole and the specific near nozzle hole, and it is possible to suppress the variation of flame propagation in the main combustion chamber. Further, by suppressing the variation of flame propagation in the main combustion chamber, it is possible to suppress knocking caused by delay of flame arrival, and it is possible to improve the engine efficiency.

(7) In some embodiments, in the above configuration (6), the specific near nozzle hole includes a nearest nozzle hole closest to the ignition portion among the plurality of nozzle holes in the near-ignition region in a plan view, and the specific far nozzle hole includes a farthest nozzle hole farthest from the ignition portion among the plurality of nozzle holes in the far-ignition region in a plan view.

With the above configuration (7), in a plan view of the precombustion chamber, the nozzle hole length of the nozzle hole (farthest nozzle hole) farthest from the ignition portion is shorter than the nozzle hole length of the nozzle hole (nearest nozzle hole) closest to the ignition portion. Thereby, in the precombustion chamber, it is possible to adjust and equalize injection start timing and injection strength of combustion flames (torch jets) injected from the nearest nozzle hole which the combustion flame produced by ignition by the ignition device reaches the earliest and the farthest nozzle hole which the combustion flame reaches the latest, and it is possible to efficiently suppress the variation of flame propagation of the torch jet in the main combustion chamber.

(8) In some embodiments, in the above configuration (6) or (7), the precombustion chamber is formed so as to deviate the precombustion chamber central axis from the main chamber central axis so that a distance between the main chamber central axis and a precombustion-chamber-side opening end of the specific far nozzle hole is longer than a distance between the main chamber central axis and a precombustion-chamber-side opening end of the specific near nozzle hole in the precombustion-chamber forming portion.

With the above configuration (8), for instance, by forming the precombustion chamber to be offset toward the specific far nozzle hole so as to deviate the main chamber central axis from the precombustion chamber central axis in the precombustion-chamber forming portion, the wall thickness of the precombustion chamber formed by the precombustion-chamber forming portion becomes thinner in the vicinity of the specific far nozzle hole than in the vicinity of the specific near nozzle hole. Thus, the nozzle hole length of the specific far nozzle hole is made shorter than the nozzle hole length of the specific near nozzle hole.

(9) According to at least one embodiment of the present invention, a precombustion chamber gas engine comprises:

a main-chamber forming portion forming a main combustion chamber; a precombustion-chamber forming portion forming a precombustion chamber communicating with the main combustion chamber via a plurality of nozzle holes; and an ignition device disposed at an upper portion of an interior of the precombustion chamber and having an ignition portion spaced from a main chamber central axis of the main combustion chamber at a predetermined distance. In a plan view, the precombustion chamber has a near-ignition region in which the ignition portion is disposed and a far-ignition region opposite to the near-ignition region separated by a borderline passing through the main chamber central axis and perpendicular to a straight line passing through a precombustion chamber central axis of the precombustion chamber and the ignition portion. The plurality of nozzle holes includes a specific far nozzle hole which is at least one nozzle hole in the ignition-far region, and the specific far nozzle hole has a precombustion-chamber-side opening end having a diameter decreasing with a distance from a connection position with the precombustion chamber.

With the above configuration (9), in a plan view of the precombustion chamber of the precombustion chamber gas engine in which the ignition portion of the ignition device (e.g., electrode of ignition plug) is spaced from the central axis of the main combustion chamber (main chamber central axis) at a predetermined distance, the precombustion-chamber-side opening end of the specific far nozzle hole in a region (ignition-far region) relatively away from the ignition portion in a plan view of the precombustion chamber has a shape (bell-mouth shape) having a diameter decreasing with a distance from the connection position with the precombustion chamber. That is, the precombustion-chamber-side opening end of the specific far nozzle hole is shaped so as to decrease inlet pressure loss with respect to the combustion flame produced by ignition by the ignition device, whereby deceleration of the combustion flame flowing into the precombustion-chamber-side opening end of the specific far nozzle hole is suppressed.

Thereby, it is possible to increase the flow velocity of the combustion flame (torch jet) injected to the main combustion chamber from the specific far nozzle hole, and thus it is possible to adjust and equalize the flow velocity of the torch jet from the specific far nozzle hole and the flow velocity of the torch jet injected from the specific near nozzle hole to the main combustion chamber. Consequently, it is possible to suppress the variation of flame propagation in the main combustion chamber. Further, by suppressing the variation of flame propagation in the main combustion chamber, it is possible to suppress knocking caused by delay of flame arrival, and it is possible to improve the engine efficiency.

(10) In some embodiments, in the above configuration (9), the specific far nozzle hole is a farthest nozzle hole farthest from the ignition portion among the plurality of nozzle holes in the far-ignition region in a plan view.

With the above configuration (10), in a plan view of the precombustion chamber, the precombustion-chamber-side opening end of the nozzle hole (farthest nozzle hole) farthest from the ignition portion has a bell-mouth shape. Thereby, in the precombustion chamber, it is possible to adjust and equalize injection start timing and injection strength of combustion flames (torch jets) injected from the nearest nozzle hole which the combustion flame produced by ignition by the ignition device reaches the earliest and the farthest nozzle hole which the combustion flame reaches the latest, and it is possible to efficiently suppress the variation of flame propagation in the main combustion chamber.

(11) In some embodiments, in any one of the above configurations (1) to (7), (9), and (10), the main chamber central axis coincides with the precombustion chamber central axis.

With the above configuration (11), in the precombustion chamber gas engine in which the precombustion chamber is provided so that the main chamber central axis of the main combustion chamber coincides with the precombustion chamber central axis of the precombustion chamber, and the ignition portion of the ignition device is spaced from the central axis of the main combustion chamber (main chamber central axis) at a predetermined distance, it is possible to suppress the variation of flame propagation in the main combustion chamber.

(12) In some embodiments, in the above configuration (11), the precombustion chamber includes: a small-diameter-cylinder forming portion forming a small-diameter cylinder chamber having a predetermined inner diameter and connected to the plurality of nozzle holes; and a large-diameter-cylinder forming portion forming a large-diameter cylinder chamber which has an inner diameter larger than that of the small-diameter cylinder chamber and in which the ignition portion of the ignition device is disposed, and the main chamber central axis coincides with a precombustion chamber central axis of the small-diameter cylinder chamber.

With the above configuration (12), in the precombustion chamber gas engine in which the precombustion chamber is provided so that the main chamber central axis of the main combustion chamber coincides with the precombustion chamber central axis of the small-diameter cylinder chamber of the precombustion chamber, and the ignition portion of the ignition device is spaced from the central axis of the main combustion chamber (main chamber central axis) at a predetermined distance, it is possible to suppress the variation of flame propagation in the main combustion chamber.

(13) In some embodiments, in any one of the above configurations (1) to (12), the predetermined distance is larger than 10% of a maximum value of an inner diameter of the precombustion chamber.

With the above configuration (13), in the precombustion chamber gas engine in which the ignition portion of the ignition device is spaced from the central axis of the main combustion chamber (main chamber central axis) at a predetermined distance, it is possible to suppress the variation of flame propagation in the main combustion chamber.

Advantageous Effects

According to at least one embodiment of the present invention, there is provided a precombustion chamber gas engine capable of controlling the variation of flame propagation in a main combustion chamber.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
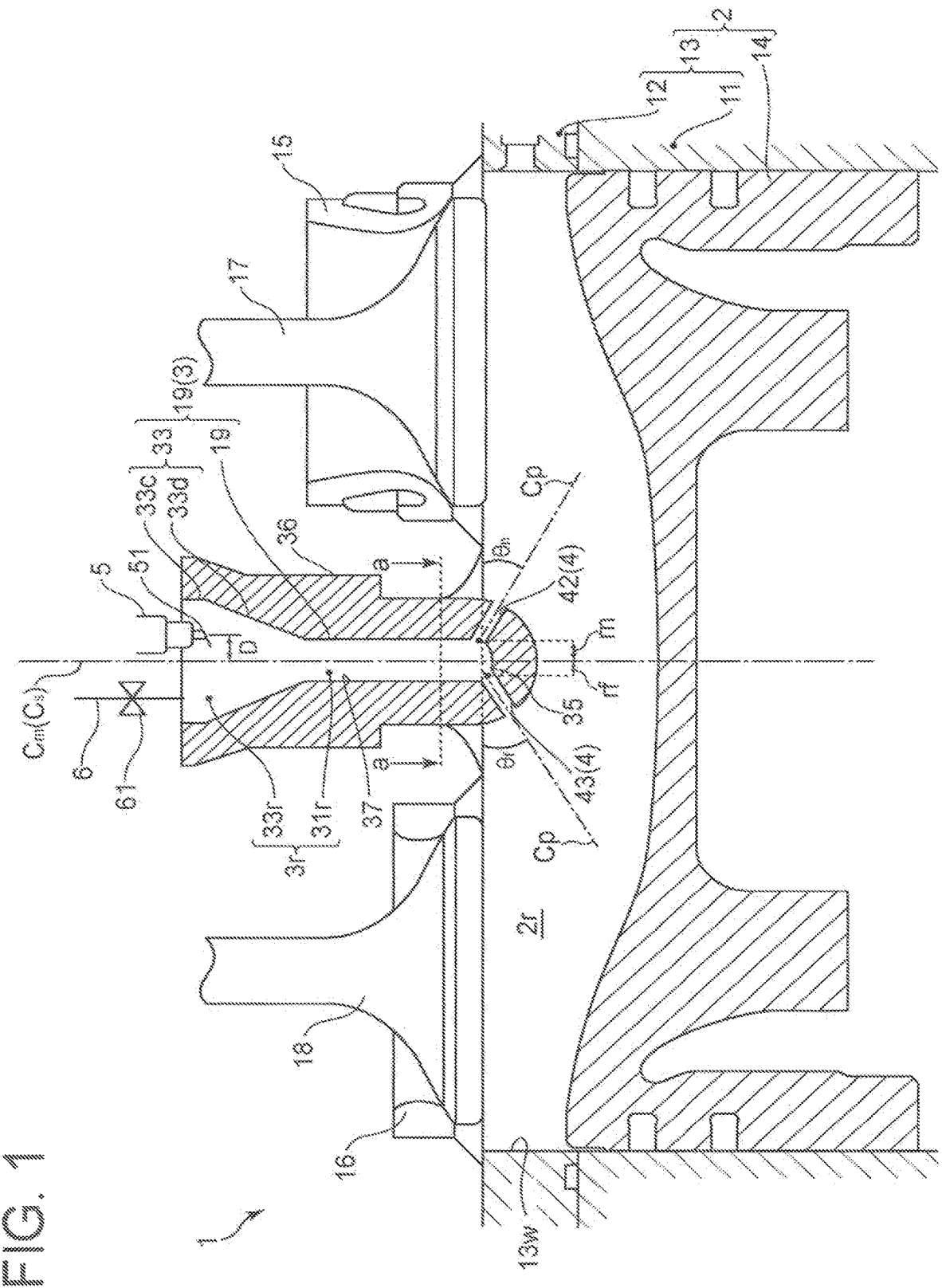
FIG. 1 is a schematic cross-sectional view of a precombustion chamber gas engine according to an embodiment of the present invention, where the distance between the precombustion chamber central axis and a specific far nozzle hole is shorter than the distance between the precombustion chamber central axis and a specific near nozzle hole.
Figure 2:
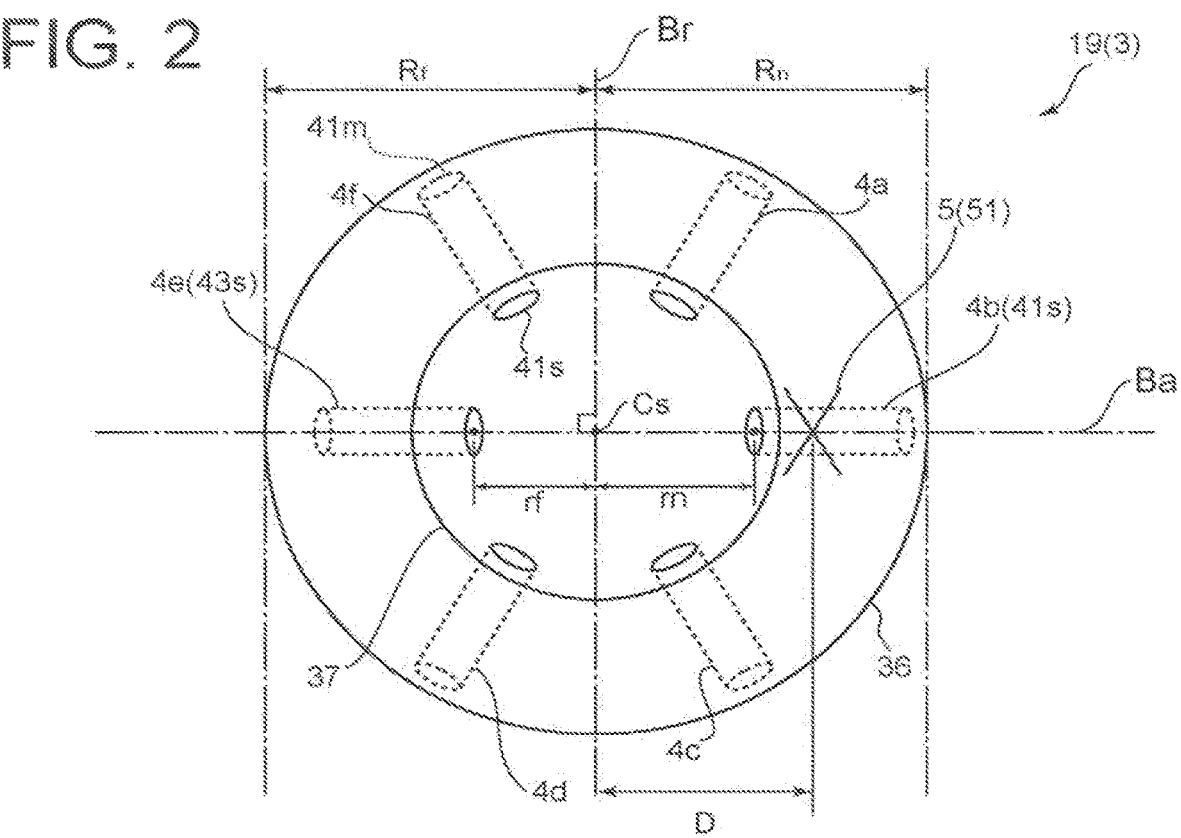
FIG. 2 is a schematic cross-sectional view of a precombustion chamber gas engine taken along line aa in FIG. 1 and shows a cross-section of a precombustion-chamber forming portion of FIG. 1.
Figure 3:
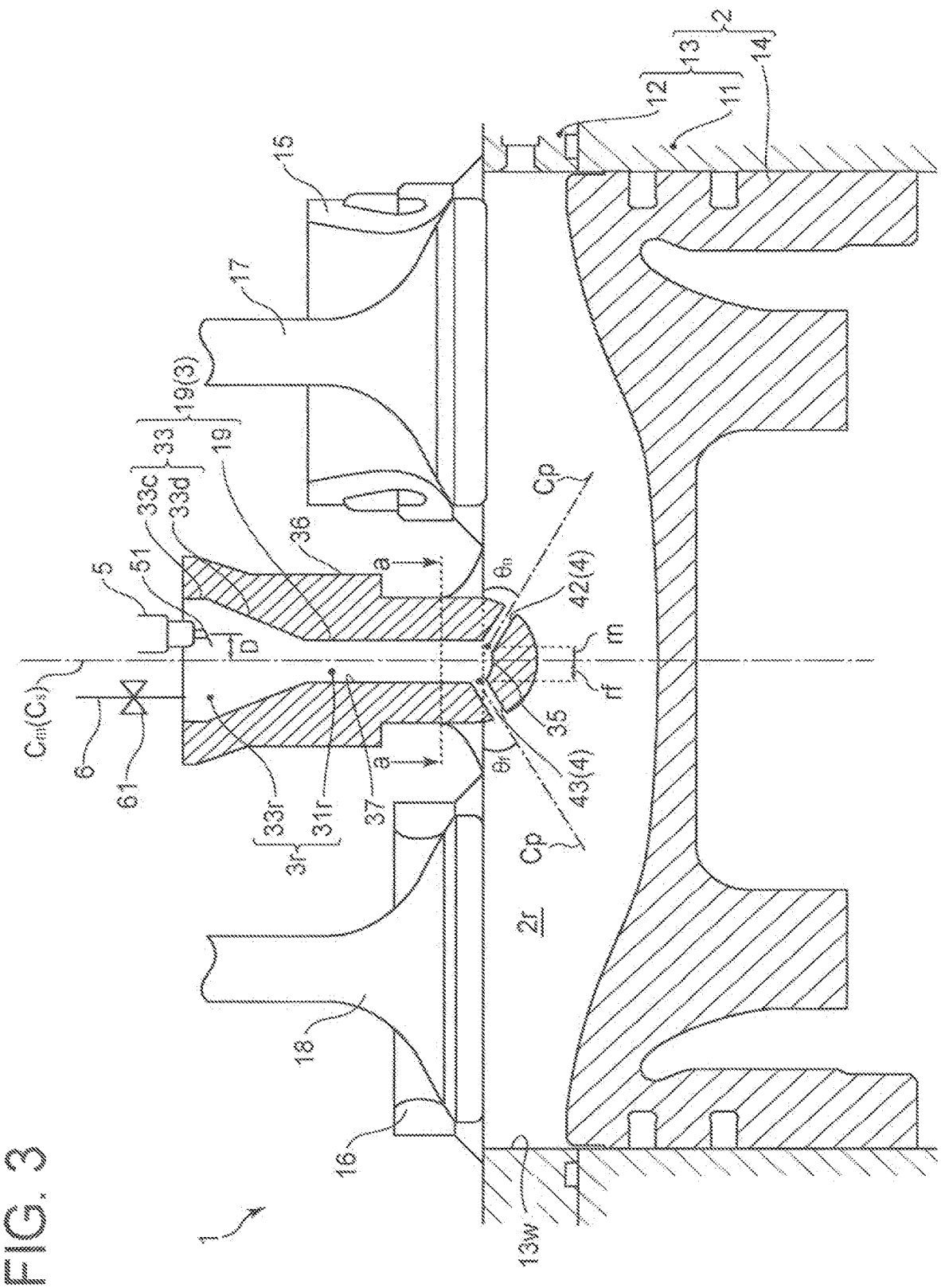
FIG. 3 is a schematic cross-sectional view of a precombustion chamber gas engine according to an embodiment of the present invention, where the distance between the precombustion chamber central axis and a specific near nozzle hole is shorter than the distance between the precombustion chamber central axis and a specific far nozzle hole.
Figure 4:
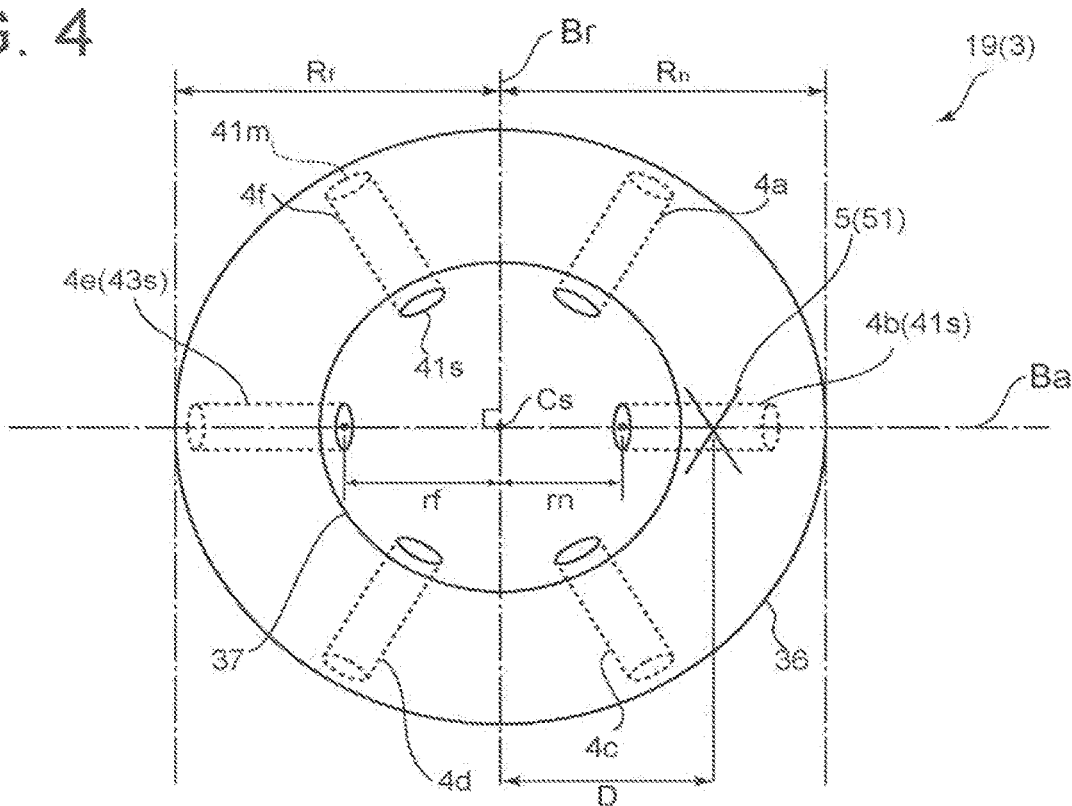
FIG. 4 is a schematic cross-sectional view of a precombustion chamber gas engine taken along line aa in FIG. 3 and shows a cross-section of a precombustion-chamber forming portion of FIG. 3.
Figure 5:
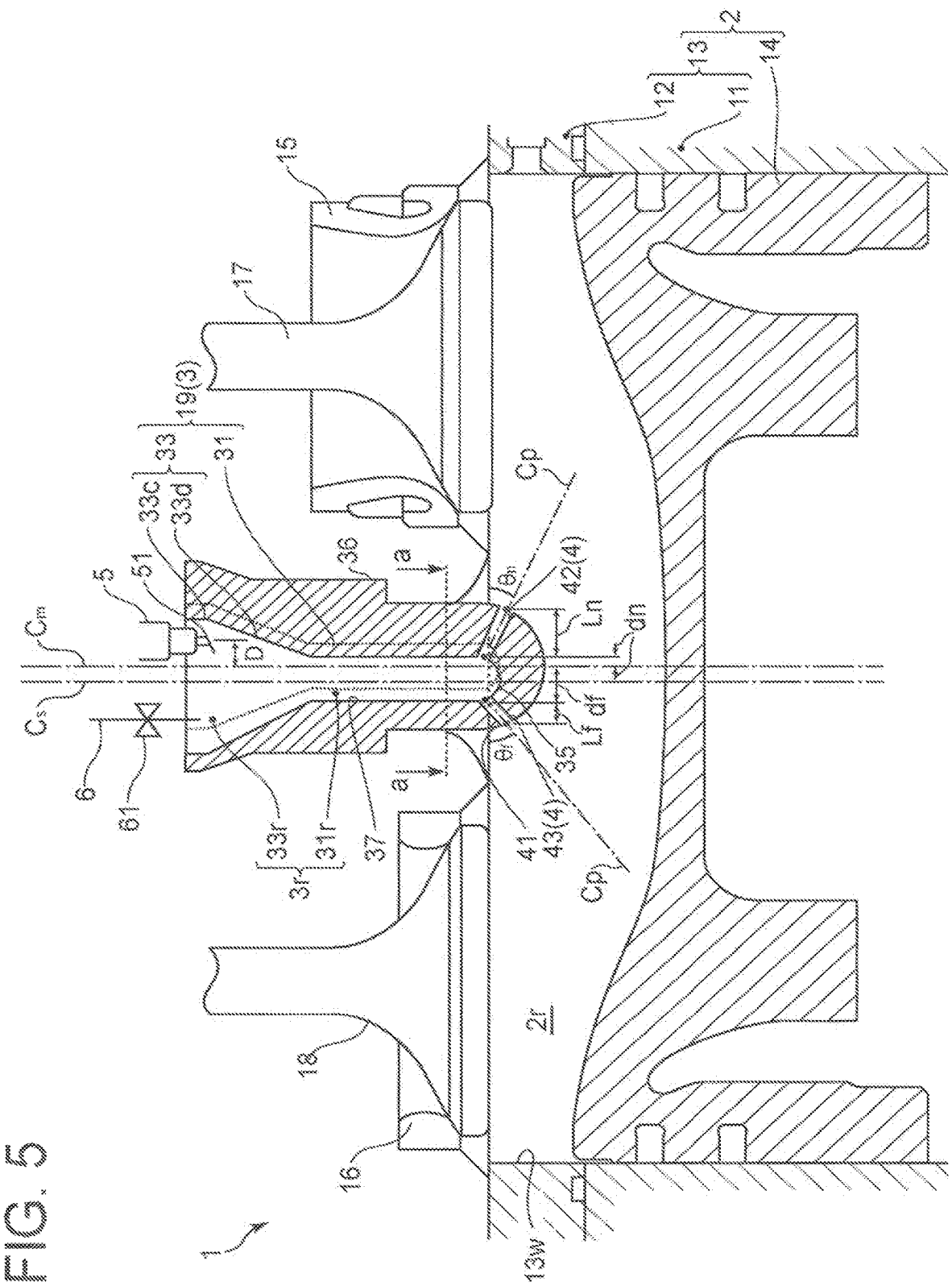
FIG. 5 is a schematic cross-sectional view of a precombustion chamber gas engine according to an embodiment of the present invention, where the nozzle hole length of a specific far nozzle hole is shorter than the nozzle hole length of a specific near nozzle hole.
Figure 6:
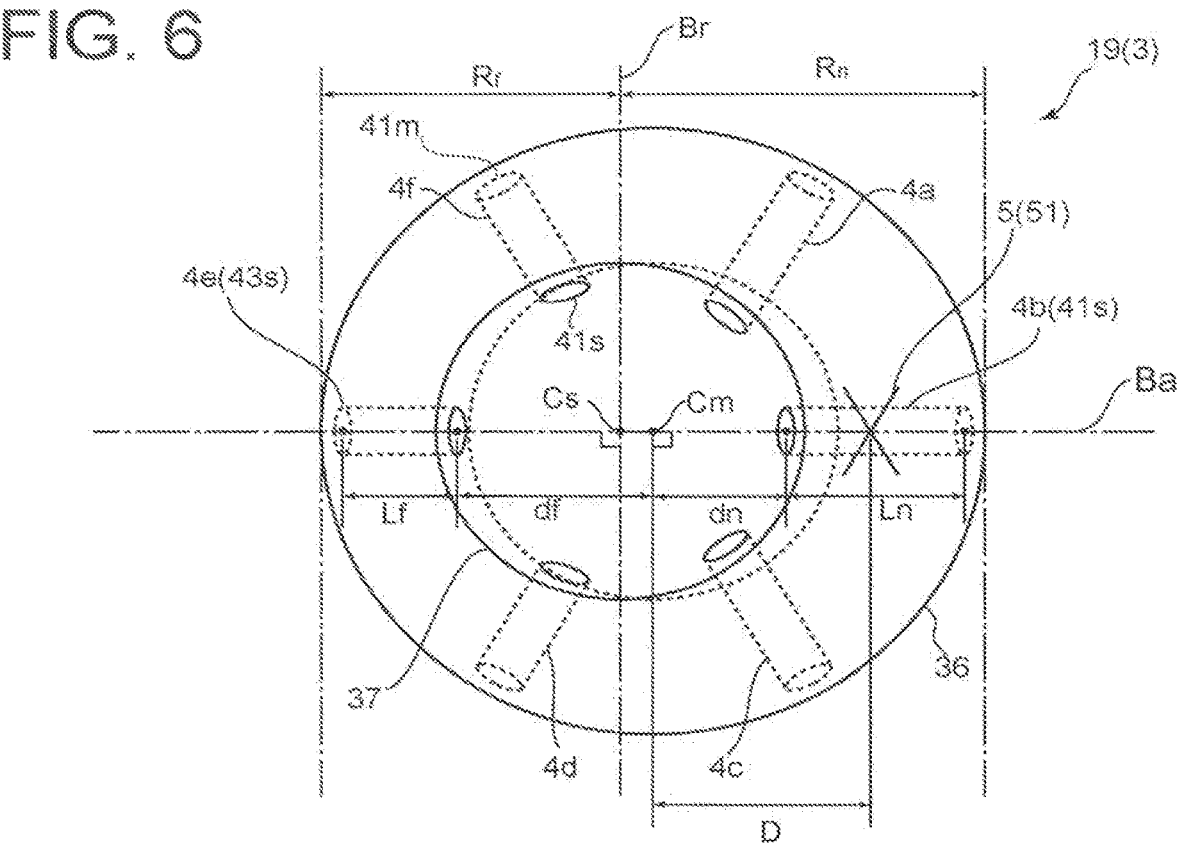
FIG. 6 is a schematic cross-sectional view of a precombustion chamber gas engine taken along line aa in FIG. 5 and shows a cross-section of a precombustion-chamber forming portion according to an embodiment of the present invention.
Figure 7:
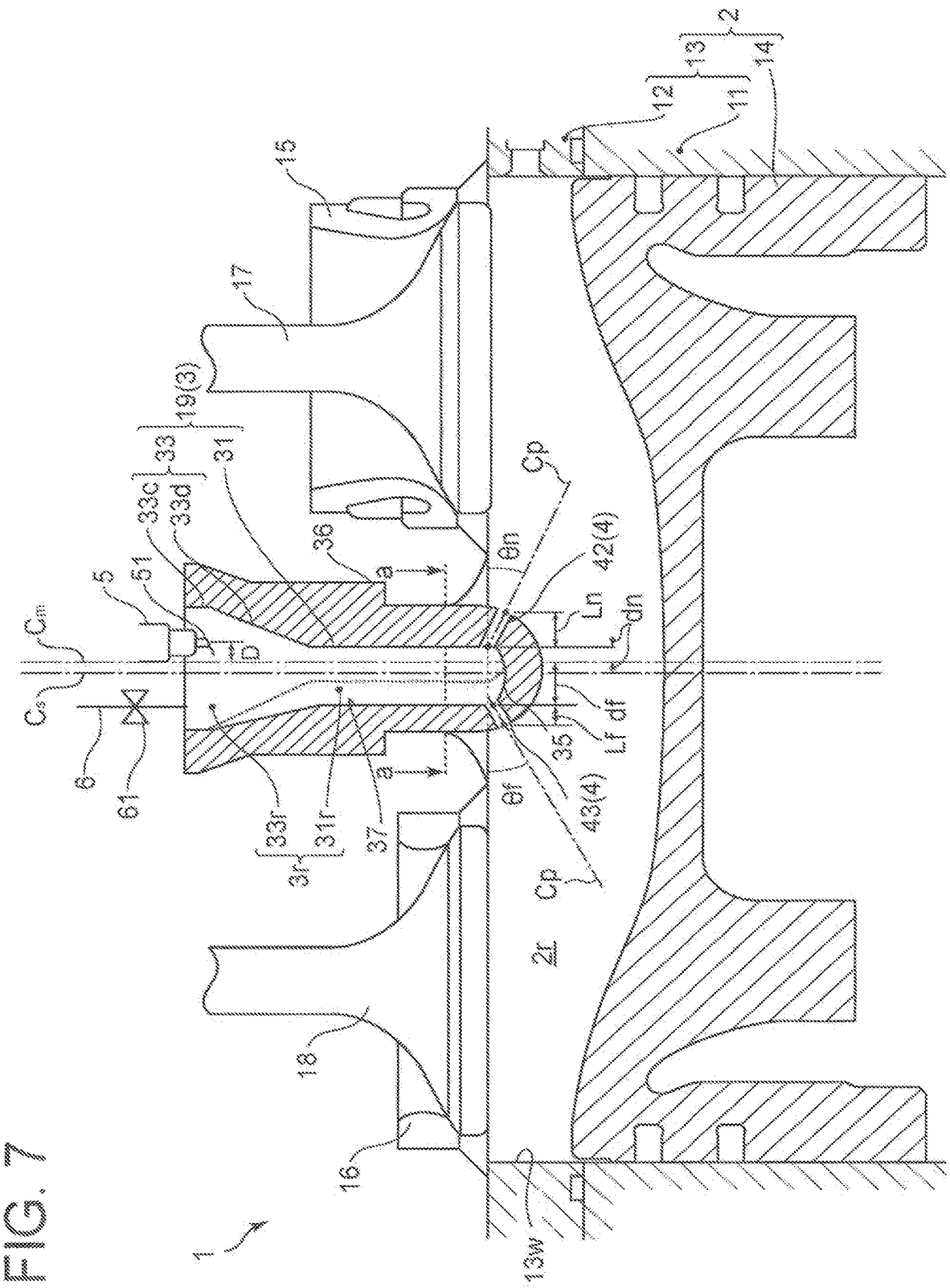
FIG. 7 is a schematic cross-sectional view of a precombustion chamber gas engine according to an embodiment of the present invention, which is a modified example of the shape of the precombustion chamber of FIG. 5.
Figure 8:
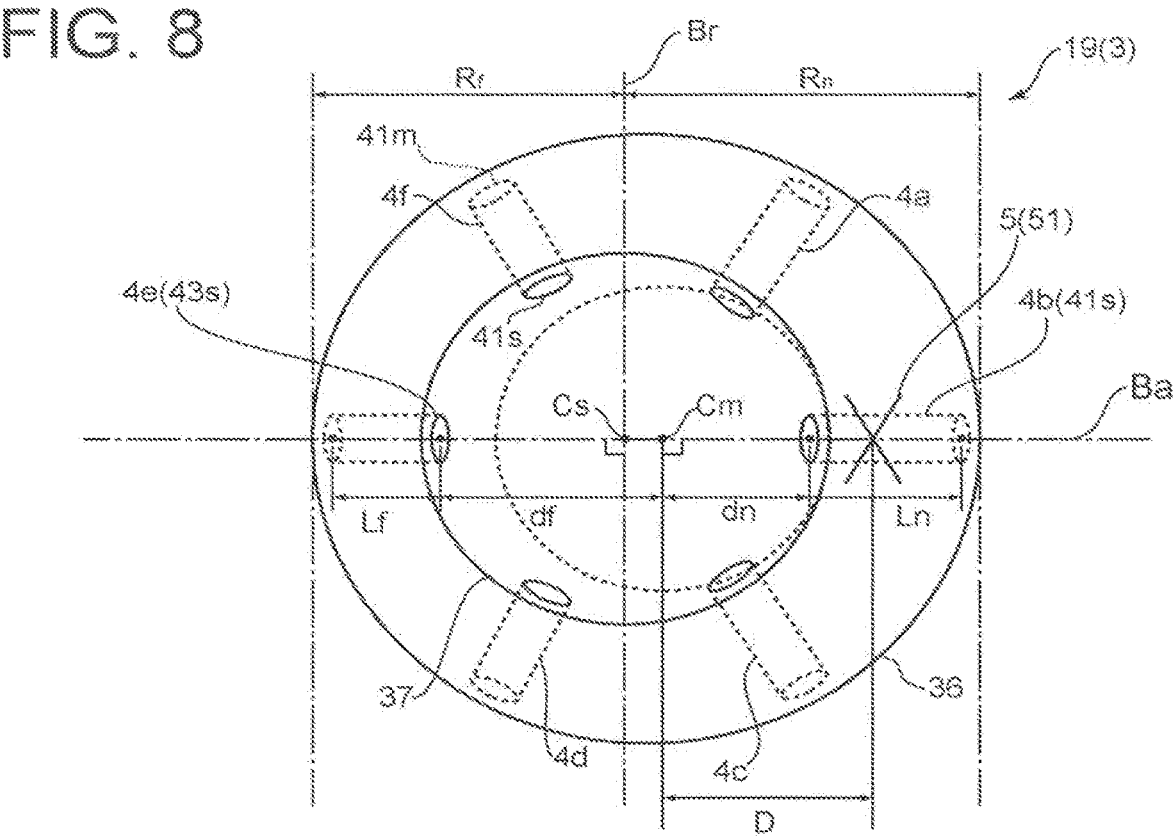
FIG. 8 is a schematic cross-sectional view of a precombustion chamber gas engine taken along line aa in FIG. 7 and shows a cross-section of a precombustion-chamber forming portion according to an embodiment of the present invention.
Figure 9:
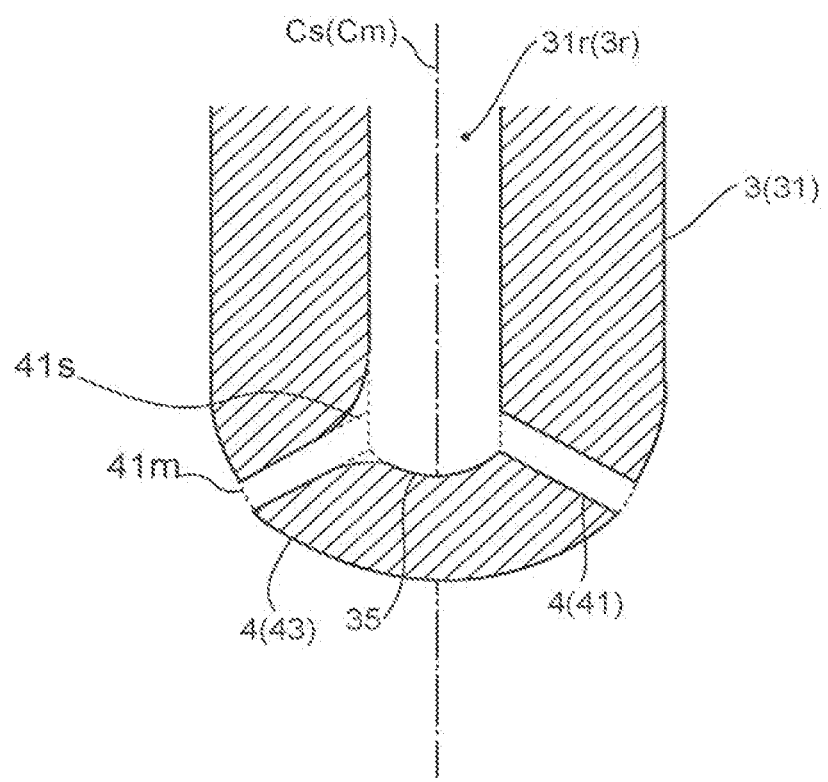
FIG. 9 is a schematic cross-sectional view of a precombustion chamber gas engine according to an embodiment of the present invention, where a precombustion-chamber-side opening end of a specific far nozzle hole has a bell-mouth shape.

FIG. 1 is a schematic cross-sectional view of a precombustion chamber gas engine 1 according to an embodiment of the present invention, where the distance rf between the precombustion chamber central axis Cs and a specific far nozzle hole 43 is shorter than the distance between the precombustion chamber central axis Cs and a specific near nozzle hole 42. FIG. 2 is a schematic cross-sectional view of a precombustion chamber gas engine taken along line aa in FIG. 1 and shows a cross-section of a precombustion-chamber forming portion 3 of FIG. 1. FIG. 3 is a schematic cross-sectional view of a precombustion chamber gas engine 1 according to an embodiment of the present invention, where the distance rn between the precombustion chamber central axis Cs and a specific near nozzle hole 42 is shorter than the distance between the precombustion chamber central axis Cs and a specific far nozzle hole 43. FIG. 4 is a schematic cross-sectional view of a precombustion chamber gas engine 1 taken along line aa in FIG. 3 and shows a cross-section of a precombustion-chamber forming portion 3 of FIG. 3. FIG. 5 is a schematic cross-sectional view of a precombustion chamber gas engine 1 according to an embodiment of the present invention, where the nozzle hole length Lf of a specific far nozzle hole 43 is shorter than the nozzle hole length Ln of a specific near nozzle hole 42. FIG. 6 is a schematic cross-sectional view of a precombustion chamber gas engine 1 taken along line aa in FIG. 5 and shows a cross-section of a precombustion-chamber forming portion 3 according to an embodiment of the present invention. FIG. 7 is a schematic cross-sectional view of a precombustion chamber gas engine 1 according to an embodiment of the present invention, which is a modified example of the shape of the precombustion chamber 3r of FIG. 5. FIG. 8 is a schematic cross-sectional view of a precombustion chamber gas engine 1 taken along line aa in FIG. 7 and shows a cross-section of a precombustion-chamber forming portion 3 according to an embodiment of the present invention. FIG. 9 is a schematic cross-sectional view of a precombustion chamber gas engine 1 according to an embodiment of the present invention, where a precombustion-chamber-side opening end 41s of a specific far nozzle hole 43 has a bell-mouth shape.

As shown in FIGS. 1 to 9, the precombustion chamber gas engine 1 includes a main-chamber forming portion 2 forming a main combustion chamber 2r, a precombustion-chamber forming portion 3 forming a precombustion chamber 3r, and an ignition device 5 disposed in the precombustion chamber 3r.

More specifically, in the embodiments shown in FIGS. 1 to 9, as shown in FIGS. 1, 3, 5, and 7, the precombustion chamber gas engine 1 includes: a cylinder 13 including a cylinder liner 11 having therein a cylinder structure of cylindrical shape and a cylinder head 12 having therein a recessed structure capable of capping the top of the cylinder structure; a piston 14 reciprocably disposed in the cylinder 13; an intake port 15 and an exhaust port 16 connected around the cylinder head 12; an intake valve 17 for opening and closing the intake port 15; an exhaust valve 18 for opening and closing the exhaust port 16; and a precombustion chamber cap 19. A main combustion chamber 2r (main chamber) is defined between the cylinder 13 and the piston 14. A precombustion chamber 3r is formed by the precombustion chamber cap 19 disposed on the cylinder head 12 so as to be positioned above the main combustion chamber 2r (opposite to the piston 14). That is, in the embodiments shown in FIGS. 1 to 9, the cylinder 13 and the piston 14 form the main-chamber forming portion 2 and the precombustion chamber cap 19 forms the precombustion-chamber forming portion 3. Additionally, the precombustion chamber gas engine 1 further includes a precombustion-chamber-gas supply device 6 for supplying a precombustion chamber fuel gas to the precombustion chamber 3*r* not via the main combustion chamber 2*r*, and the supply of the precombustion chamber fuel gas to the precombustion chamber 3*r* is controlled by a precombustion-chamber-fuel-gas supply valve 61 (see FIGS. 1, 3, 5, and 7).

Further, the ignition device 5 has an ignition portion 51 capable of igniting an air-fuel mixture, and is disposed on an engine so that the ignition portion 51 is spaced from the central axis of the main combustion chamber 2*r* (hereinafter, main chamber central axis Cm) at a predetermined distance D. For instance, the ignition device 5 may be an ignition plug of a spark ignition type. In this case, the ignition portion 51 is a portion including an electrode which generates a spark. The predetermined distance D may be larger than 10% of a maximum value of the inner diameter of the main combustion chamber 2*r*. As described later, in a case where the precombustion chamber 3*r* includes a small-diameter cylinder chamber 31*r* and a large-diameter cylinder chamber 33*r*, the ignition portion 51 may be disposed in the large-diameter cylinder chamber 33*r* (constant diameter cylinder portion 33*c*), and the predetermined distance D may be a maximum value of the inner diameter of the large-diameter cylinder chamber 33*r*.

On the other hand, the precombustion-chamber forming portion 3 includes a plurality of nozzle holes 4 connecting the precombustion chamber 3*r* formed in the precombustion-chamber forming portion 3 to the outside. The main combustion chamber 2*r* communicates with the precombustion chamber 3*r* via the plurality of nozzle holes 4. More specifically, each of the nozzle holes 4 has a main-chamber-side opening end 41*m* connected to the main combustion chamber 2*r* on one side and a precombustion-chamber-side opening end 41*s* connected to the precombustion chamber 3*r* on the other side. The precombustion-chamber-side opening end 41*s* may be connected to the precombustion chamber 3*r* above a bottom portion 35 including a portion furthest from the top portion where the ignition portion 51 is disposed (see FIGS. 1, 3, 5, and 7). Further, as shown in FIG. 2, the plurality of nozzle holes 4 are arranged around the central axis of the precombustion chamber 3*r* (hereinafter, precombustion chamber central axis Cs) at an equal interval, and each of the nozzle holes 4 is formed so as to penetrate the precombustion-chamber forming portion 3 linearly along the radial direction of the precombustion chamber central axis Cs, in a plan view. For instance, the cross-sectional shape (shape in plan view) of the precombustion-chamber forming portion 3 (precombustion chamber cap 19) having the precombustion chamber central axis Cs as a normal is circular. In a case where the precombustion-chamber forming portion 3 has, for instance, six linear nozzle holes 4, the nozzle holes 4 are disposed along the radial direction and arranged at an equal interval of 60° around the precombustion chamber central axis Cs (see FIG. 2). Further, each of the nozzle holes 4 extends linearly at a predetermined angle θ of depression (described later) (see FIGS. 1, 3, 5, and 7). The angle θ of depression of the nozzle hole 4 is an angle between a line perpendicular to the main chamber central axis Cm and the central line Cp of the nozzle hole 4.

In the embodiments shown in FIGS. 1 to 9, the precombustion chamber 3*r* includes a small-diameter-cylinder forming portion 31 forming a small-diameter cylinder chamber 31*r* having a predetermined inner diameter and connected to the plurality of nozzle holes 4 and a large-diameter-cylinder forming portion 33 forming a large-diameter cylinder chamber 33*r* which has an inner diameter larger than that of the small-diameter cylinder chamber 31*r* and in which the ignition portion 51 of the ignition device 5 is disposed. In other words, the precombustion-chamber forming portion 3 (precombustion chamber cap 19) includes a small-diameter-cylinder forming portion 31 and a large-diameter-cylinder forming portion 33. Further, the large-diameter-cylinder forming portion 33 includes a cylindrical enlarged diameter cylinder portion 33*d* connected to the small-diameter cylinder chamber 31*r* and having an inner diameter increasing with a distance from the small-diameter cylinder chamber 31*r* and a cylindrical constant diameter cylinder portion 33*c* connected to the enlarged diameter cylinder portion 33*d* and having an inner diameter equal to the maximum diameter of the enlarged diameter cylinder portion 33*d*. Further, the precombustion chamber central axis Cs coincides with the central axis of the small-diameter cylinder chamber 31*r*.

However, the present invention is not limited to the present embodiments. In some embodiments, the precombustion chamber 3*r* may have other shape, for instance, a cylindrical shape having a constant inner diameter.

Further, in some embodiments, as shown in FIGS. 1 to 4, the main chamber central axis Cm may coincide with the precombustion chamber central axis Cs. Alternatively, in some embodiments, as shown in FIGS. 5 to 8, the main chamber central axis Cm may not coincide with the precombustion chamber central axis Cs, such as a case where the precombustion chamber central axis Cs is oblique to the main chamber central axis Cm. Further, the central axis of the small-diameter cylinder chamber 31*r* may not coincide with the central axis of the large-diameter cylinder chamber 33*r*.

The precombustion chamber gas engine 1 having the above configuration opens the intake valve 17 and closes the exhaust valve 18 when the piston 14 moves downward at the intake stroke, for instance. As the intake valve 17 opens, a lean premixed gas containing a mixture of a fuel gas and air is introduced into the cylinder 13 through the intake port 15 connected to the intake valve 17. As the precombustion-chamber-fuel-gas supply valve 61 opens, a precombustion chamber fuel gas is introduced into the precombustion chamber 3*r*. Furthermore, at the compression stroke, the precombustion-chamber-fuel-gas supply valve 61 closes when the piston 14 moves upward. Further, the lean premixed gas introduced into the cylinder 13 through the intake port 15 is compressed as the piston 14 moves upward, and a part of the lean premixed gas is introduced into the precombustion chamber 3*r* through each of the nozzle holes 4 of the precombustion chamber 3*r*. The lean premixed gas introduced from the main combustion chamber 2*r* to the precombustion chamber 3*r* is mixed with the precombustion chamber fuel gas to produce an air-fuel mixture having a concentration suitable for ignition in the precombustion chamber 3*r*. The air-fuel mixture in the precombustion chamber 3*r* is ignited by the ignition device 5 at a predetermined timing when the piston 14 arrives at the vicinity of the compression top dead center, and the air-fuel mixture in the precombustion chamber 3*r* is thus combusted. A combustion flame caused by this combustion is injected into the cylinder 13 through each of the nozzle holes and ignites the lean premixed gas in the cylinder 13, which leads to combustion of the lean premixed gas in the main combustion chamber 2*r*.

At this time, the present inventors have found through numerical analysis and the like that in the precombustion chamber gas engine 1 according to the present invention, since the ignition portion 51 of the ignition device 5 is spaced from the main chamber central axis Cm at a predetermined distance D, the timing at which the combustion flame produced by ignition of the air-fuel mixture in the precombustion chamber by the ignition portion 51 reaches each of the nozzle holes 4 varies. Further, they found that, if the timing of arrival of the combustion flame produced by ignition by the ignition device varies among the nozzle holes 4 and if, for instance, the nozzle holes 4 have the same shape, variation occurs in injection start timing at which combustion flame (hereinafter, referred to as torch jet as appropriate) is injected to the main combustion chamber 2r from each of the nozzle holes 4 through a corresponding main-chamber-side opening end 41m and in injection strength thereof. If injection start timing and injection strength of torch jet from each of the nozzle holes 4 vary, flame propagation in the main combustion chamber 2r also varies. The variation of flame propagation in the main combustion chamber 2r causes unburned gas to remain in a region where flame propagation delays, which may cause knocking and degrade thermal efficiency and output power of the precombustion chamber gas engine 1.

In view of this, the present inventors have arrived at suppressing the variation of flame propagation in the main combustion chamber 2r by changing the shape of at least one nozzle hole 4 of the plurality of nozzle holes 4 so as to suppress the variation of injection start timing and injection strength of torch jet injected to the main combustion chamber 2r from each of the nozzle holes 4.

The shape of the plurality of nozzle holes 4 in some embodiments of the present invention will now be described.

In the present invention, in a plan view as shown in FIG. 2, the precombustion chamber 3r has a near-ignition region Rn in which the ignition portion 51 is disposed and a far-ignition region Rf opposite to the near-ignition region Rn separated by a borderline Br passing through the precombustion chamber central axis Cs of the precombustion chamber 3r and perpendicular to a straight line (reference line Ba) passing through the precombustion chamber central axis Cs and the ignition portion 51. In other words, in a plan view, the precombustion chamber 3r is divided by the borderline Br into two regions of a near-ignition region Rn relatively close to the ignition portion 51 and a far-ignition region Rf relatively far from the ignition portion 51 having the same size.

First, embodiments relating to connection position between the precombustion-chamber-side opening end 41s of the nozzle hole 4 and the precombustion chamber 3r will be described with reference to FIGS. 1 to 4.

In some embodiments, as shown in FIGS. 1 and 2, a distance rf between the precombustion chamber central axis Cs and a precombustion-chamber-side opening end 41s, connected to the precombustion chamber 3r, of a specific far nozzle hole 43 which is at least one nozzle hole 4 in the far-ignition region Rf is shorter than a distance rn between the precombustion chamber central axis Cs and a precombustion-chamber-side opening end 41s of a specific near nozzle hole 42 which is at least one nozzle hole 4 in the near-ignition region Rn (rf<rn).

Alternatively, in some embodiments, as shown in FIGS. 3 and 4, a distance rn between the precombustion chamber central axis Cs and a precombustion-chamber-side opening end 41s, connected to the precombustion chamber 3r, of a specific near nozzle hole 42 which is at least one nozzle hole 4 in the near-ignition region Rn is shorter than a distance rf between the precombustion chamber central axis Cs and a precombustion-chamber-side opening end 41s of a specific far nozzle hole 43 which is at least one nozzle hole 4 in the far-ignition region Rf (rf>rn).

In the embodiments shown in FIGS. 1 to 9, the precombustion-chamber-side opening end 41s of each of the plurality of nozzle holes 4, or the precombustion-chamber-side opening end 41s of each of the nozzle holes 4 other than the specific near nozzle hole 42 or the specific far nozzle hole 43 is connected to the precombustion chamber 3r at a position above the bottom portion 35 of the precombustion-chamber forming portion 3 (precombustion chamber 3r) (see FIGS. 1, 3, 5, 7, and 9).

Here, the present inventors have found that the combustion flame produced by ignition by the ignition device 5 reaches the precombustion-chamber-side opening end 41s of the specific near nozzle hole 42, a portion (center of bottom portion 35 of precombustion chamber 3r) through which the precombustion chamber central axis Cs passes, and the precombustion-chamber-side opening end 41s of the specific far nozzle hole 43 in this order. Further, the present inventors have found that, by forming the precombustion-chamber-side opening end 41s of the specific far nozzle hole 43 adjacent to the center of the bottom portion of the precombustion chamber 3r, it is possible to advance the timing at which the combustion flame produced by ignition by the ignition device 5 reaches the precombustion-chamber-side opening end 41s of the specific far nozzle hole 43. Conversely, the present inventors have found that, by forming the precombustion-chamber-side opening end 41s of the specific near nozzle hole 42 adjacent to the center of the bottom portion of the precombustion chamber 3r, it is possible to delay the timing at which the combustion flame produced by ignition by the ignition device 5 reaches the precombustion-chamber-side opening end 41s of the specific near nozzle hole 42.

Thus, by bringing the precombustion-chamber-side opening end 41s of the specific near nozzle hole 42 or the specific far nozzle hole 43 close to the center of the bottom portion of the precombustion chamber 3r, it is possible to reduce the difference between timings at which the combustion flame produced by ignition by the ignition device 5 reaches the respective precombustion-chamber-side opening ends 41s of the specific near nozzle hole 42 and the specific far nozzle hole 43. Thereby, it is possible to adjust and equalize injection start timing and injection strength of combustion flames (torch jets) injected from respective main-chamber-side opening ends 41m of the specific near nozzle hole 42 and the specific far nozzle hole 43, and it is possible to suppress the variation of flame propagation in the main combustion chamber 2r. Further, by suppressing the variation of flame propagation in the main combustion chamber 2r, it is possible to suppress knocking caused by delay of flame arrival, and it is possible to improve the engine efficiency.

More specifically, in some embodiments, as shown in FIG. 2, the specific near nozzle hole 42 may be a nearest nozzle hole 42s which is a nozzle hole 4 closest to the ignition portion 51 in the near-ignition region Rn in a plan view; and the specific far nozzle hole 43 may be a farthest nozzle hole 43s which is a nozzle hole 4 farthest from the ignition portion 51 in the far-ignition region Rf in a plan view. In the embodiments shown in FIGS. 1 to 3, three nozzle holes 4 (4a to 4c) exist in the near-ignition region Rn, and the specific near nozzle hole 42 is one nozzle hole 4b (nearest nozzle hole 42s) extending along the reference line Ba in the near-ignition region Rn. On the other hand, three nozzle holes 4 (4d to 4f) exist also in the far-ignition region Rf, and the specific far nozzle hole 43 is one nozzle hole 4e (farthest nozzle hole 43s) extending along the reference line Ba in the far-ignition region Rf.

Further, in the embodiment shown in FIGS. 1 and 2, as depicted, the distance rf between the precombustion chamber central axis Cs and the precombustion-chamber-side opening end 41s of the specific far nozzle hole 43 is shorter than the distance rn between the precombustion chamber central axis Cs and the precombustion-chamber-side opening end 41s of the specific near nozzle hole 42 (rf<rn). Conversely, in the embodiment shown in FIGS. 3 and 4, the distance rn between the precombustion chamber central axis Cs and the precombustion-chamber-side opening end 41s of the specific near nozzle hole 42 is shorter than the distance rf between the precombustion chamber central axis Cs and the precombustion-chamber-side opening end 41s of the specific far nozzle hole 43 (rf>rn). The distance rn may be a distance between the central line Cp of the nozzle hole 4 in the precombustion-chamber-side opening end 41s and the precombustion chamber central axis Cs.

However, the present invention is not limited to the present embodiments. The specific near nozzle hole 42 may be one or more, a plurality of nozzle holes 4, and the specific far nozzle hole 43 may be one or more, a plurality of nozzle holes 4. In a case where the specific far nozzle hole 43 includes a plurality of nozzle holes 4, they may be arranged so that a nozzle hole 4 with a later arrival timing has a precombustion-chamber-side opening end 41s closer to the precombustion chamber central axis Cs, in accordance with the timing of arrival of the combustion flame produced in the precombustion chamber 3r. Moreover, in a case where the specific near nozzle hole 42 includes a plurality of nozzle holes 4, they may be arranged so that a nozzle hole 4 with an earlier arrival timing has a precombustion-chamber-side opening end 41s closer to the precombustion chamber central axis Cs, in accordance with the timing of arrival of the combustion flame produced in the precombustion chamber 3r. Further, the nearest nozzle hole 42s may not be the specific near nozzle hole 42. Similarly, the farthest nozzle hole 43s may not be the specific far nozzle hole 43.

With the above configuration, in a plan view of the precombustion chamber 3r, the distance rf between the precombustion chamber central axis Cs and the precombustion-chamber-side opening end 41s of the nozzle hole (farthest nozzle hole 43s) having the main-chamber-side opening end 41m farthest from the ignition portion 51 is shorter than the distance rn between the precombustion chamber central axis Cs and the precombustion-chamber-side opening end 41s of the nozzle hole (nearest nozzle hole 42s) having the main-chamber-side opening end 41m closest to the ignition portion 51. Thereby, it is possible to adjust and advance the timing at which the combustion flame produced by ignition by the ignition device 5 reaches the farthest nozzle hole 43s. Thus, it is possible to bring injection start timing of the farthest nozzle hole 43s close to injection start timing of the nearest nozzle hole 42s which the combustion flame reaches earliest. Consequently, it is possible to suppress the variation of inject start timing at which the flame is injected to the main combustion chamber 2r from each of the nozzle holes 4, and thus it is possible to efficiently suppress the variation of flame propagation in the main combustion chamber 2r.

Further, in some embodiments, as shown in FIG. 2, the distance rf between the precombustion chamber central axis Cs and the precombustion-chamber-side opening end 41s of the specific far nozzle hole 43 is shorter than an average of distances between the precombustion chamber central axis Cs and the respective precombustion-chamber-side opening ends 41s of the plurality of nozzle holes 4. In the embodiment shown in FIG. 2, the specific far nozzle hole 43 is the farthest nozzle hole 43s, and the respective precombustion-chamber-side opening ends 41s of the other five nozzle holes 4 have the same distance rn from the precombustion chamber central axis Cs. Further, the distance rf between the precombustion chamber central axis Cs and the precombustion-chamber-side opening end 41s of the specific far nozzle hole 43 (farthest nozzle hole 43s) is smaller than the distance (distance rn in FIG. 2) between the precombustion chamber central axis Cs and the precombustion-chamber-side opening end 41s of each of the other five nozzle holes 4, and is shorter than an average of the distances between the precombustion chamber central axis Cs and the respective precombustion-chamber-side opening ends 41 of the six nozzle holes 4.

With the above configuration, by making the distance rf between the precombustion chamber central axis Cs and the precombustion-chamber-side opening end 41s of the specific far nozzle hole 43 shorter than the average, the distance rf between the precombustion chamber central axis Cs and the precombustion-chamber-side opening end 41s of the specific far nozzle hole 43 is made shorter than the distance rn between the precombustion chamber central axis Cs and the precombustion-chamber-side opening end 41s of the specific near nozzle hole 42.

In some embodiments, as shown in FIG. 4, the distance rn between the precombustion chamber central axis Cs and the precombustion-chamber-side opening end 41s of the specific near nozzle hole 42 is shorter than an average of distances between the precombustion chamber central axis Cs and the respective precombustion-chamber-side opening ends 41s of the plurality of nozzle holes 4. In the embodiment shown in FIG. 4, the specific near nozzle hole 42 is the nearest nozzle hole 42s, and the respective precombustion-chamber-side opening ends 41s of the other five nozzle holes 4 have the same distance rf from the precombustion chamber central axis Cs. Further, the distance rn between the precombustion chamber central axis Cs and the precombustion-chamber-side opening end 41s of the specific near nozzle hole 42 (nearest nozzle hole 42s) is smaller than the distance (distance if in FIG. 4) between the precombustion chamber central axis Cs and the precombustion-chamber-side opening end 41s of each of the other five nozzle holes 4, and is shorter than an average of the distances between the precombustion chamber central axis Cs and the respective precombustion-chamber-side opening ends 41 of the six nozzle holes 4.

With the above configuration, by making the distance rn between the precombustion chamber central axis Cs and the precombustion-chamber-side opening end 41s of the specific near nozzle hole 42 shorter than the average, the distance rn between the precombustion chamber central axis Cs and the precombustion-chamber-side opening end 41s of the specific near nozzle hole 42 is made shorter than the distance rf between the precombustion chamber central axis Cs and the precombustion-chamber-side opening end 41s of the specific far nozzle hole 43 (rn<rf).

Further, in the embodiments as shown in FIGS. 1 to 4, in some embodiments, the angle θf of depression of the specific far nozzle hole 43 is equal to the angle θn of depression of the specific near nozzle hole 42. Thus, since the angle θf of depression of the specific far nozzle hole 43 is equal to the angle θn of depression of the specific near nozzle hole 42, it is possible to reduce the difference between timings at which the combustion flame produced by ignition by the ignition device 5 reaches the respective precombustionchamber-side opening ends 41s of the specific near nozzle hole 42 and the specific far nozzle hole 43, while suppressing the influence on a time required for the torch jet injected from each of the nozzle holes 4 to propagate to an cylinder wall surface 13w.

Second, embodiments relating to shape of the precombustion chamber 3r formed in the precombustion-chamber forming portion 3 (precombustion-chamber cap 19) will be described with reference to FIGS. 5 to 8.

In some embodiments, as shown in FIGS. 5 to 8, a nozzle hole length Lf of a specific far nozzle hole 43 which is at least one nozzle hole 4 in the far-ignition region Rf is shorter than a nozzle hole length Ln of a specific near nozzle hole 42 which is at least one nozzle hole 4 in the near-ignition region Rn. As the nozzle hole length L increases, the combustion flame needs time to pass through the nozzle hole 4. Accordingly, in the precombustion chamber 3r, by setting the nozzle hole length Lf of the specific far nozzle hole 43 which the combustion flame produced by ignition by the ignition device 5 reaches later to be shorter than the nozzle hole length Ln of the specific near nozzle hole 42 which the combustion flame reaches earlier, it is possible to adjust and equalize injection start timing and injection strength of torch jets injected to the main combustion chamber 2r from the respective main-chamber-side opening ends 41m of the specific far nozzle hole 43 and the specific near nozzle hole 42, and it is possible to suppress the variation of flame propagation in the main combustion chamber 2r. Further, by suppressing the variation of flame propagation in the main combustion chamber 2r, it is possible to suppress knocking caused by delay of flame arrival, and it is possible to improve the engine efficiency.

More specifically, in some embodiments, as shown in FIGS. 5 to 8, the precombustion chamber 3r is formed so as to deviate the precombustion chamber central axis Cs from the main chamber central axis Cm so that a distance df between the main chamber central axis Cm and the precombustion-chamber-side opening end 41s of the specific far nozzle hole 43 is longer than a distance do between the main chamber central axis Cm and the precombustion-chamber-side opening end 41s of the specific near nozzle hole 42 in the precombustion-chamber forming portion 3. In the embodiments shown in FIGS. 5 to 8, the dotted line shows a case where an outer peripheral surface 36 of the small-diameter-cylinder forming portion 31 is concentric with an inner peripheral surface 37 defining the precombustion chamber 3r (precombustion chamber central axis Cs coincides with the main chamber central axis Cm).

Further, in the embodiment shown in FIGS. 5 and 6, the precombustion chamber 3r (small-diameter cylinder chamber 31r) shown by the solid line is formed so that the center of the inner peripheral surface 37 (precombustion chamber central axis Cs of small-diameter cylinder chamber 31r) is displaced toward the far-ignition region Rf while the diameter of the inner peripheral surface 37 having a circular shape is the same as that shown by the dotted line in a plan view (FIG. 6).

On the other hand, in the embodiment shown in FIGS. 7 and 8, the precombustion chamber 3r (small-diameter cylinder chamber 31r) shown by the solid line is formed so that the diameter of the inner peripheral surface 37 is larger than that shown by the dotted line in a plan view (FIG. 8). More specifically, as shown in FIG. 8, while the position of the farthest nozzle hole 43s is fixed, the center of the inner peripheral surface 37 (precombustion chamber central axis Cs of small-diameter cylinder chamber 31r) is shifted along the central line Cp of the farthest nozzle hole 43s to make the diameter of the inner peripheral surface 37 larger than that shown by the dotted line.

Accordingly, as shown in FIGS. 5 to 8, the wall thickness (distance between outer peripheral surface 36 and inner peripheral surface 37) of the precombustion-chamber forming portion 3 on the side of the far-ignition region Rf is thinner than the wall thickness of the precombustion-chamber forming portion 3 on the side of the near-ignition region Rn by the amount of displacement of the precombustion chamber central axis Cs from the main chamber central axis Cm. Conversely, the wall thickness (distance between outer peripheral surface 36 and inner peripheral surface 37) of the precombustion-chamber forming portion 3 on the side of the near-ignition region Rn is thicker than the wall thickness of the precombustion-chamber forming portion 3 on the side of the far-ignition region Rf by the amount of displacement of the precombustion chamber central axis Cs from the main chamber central axis Cm. That is, the nozzle hole length Lf of the specific far nozzle hole 43 is shorter than the nozzle hole length Ln of the specific near nozzle hole 42.

In the embodiments shown in FIGS. 5 to 8, as shown in FIGS. 6 and 8, among the plurality of nozzle holes 4 disposed in the far-ignition region Rf (three nozzle holes 4d to 4f in FIGS. 6 and 8), a nozzle hole farther from the ignition portion 51 has a shorter nozzle hole length Lf in a plan view. That is, the farthest nozzle hole 43s has the shortest nozzle hole length Lf Conversely, among three nozzle holes 4 disposed in the near-ignition region Rn (three nozzle holes 4a to 4c in FIGS. 6 and 8), a nozzle hole farther from the ignition portion 51 has a longer nozzle hole length Lf in a plan view. That is, the nearest nozzle hole 42s has the shortest nozzle hole length Ln. In the examples of FIGS. 6 and 8, the nozzle hole length of the nearest nozzle hole 42s (nozzle hole 4e) shown by the solid line is equal to the nozzle hole length of the nozzle hole 4e shown by the dotted line.

With the above configuration, for instance, by forming the precombustion chamber 3r to be offset toward the specific far nozzle hole 43 so as to deviate the precombustion chamber central axis Cs from the main chamber central axis Cm in the precombustion-chamber forming portion 3, the wall thickness of the precombustion chamber 3r formed by the precombustion-chamber forming portion 3 becomes thinner in the vicinity of the specific far nozzle hole 43 than in the vicinity of the specific near nozzle hole 42. Thus, the nozzle hole length Lf of the specific far nozzle hole 43 is made shorter than the nozzle hole length Ln of the specific near nozzle hole 42.

Third, embodiments relating to shape of the precombustion-chamber-side opening end 41s of the nozzle hole 4 will be described with reference to FIG. 9.

In some embodiments, as shown in FIG. 9, a specific far nozzle hole 43 which is at least one nozzle hole 4 in the far-ignition region Rn has a precombustion-chamber-side opening end 41s of a shape (bell-mouth shape) having a diameter decreasing with a distance from the connection position with the precombustion chamber 3r. That is, the precombustion-chamber-side opening end 41s of the specific far nozzle hole 43 is shaped so as to decrease inlet pressure loss with respect to the combustion flame produced by ignition by the ignition device 5. In the embodiment shown in FIG. 9, the precombustion-chamber-side opening end 41s of the specific far nozzle hole 43 has a predetermined curvature Cf, and the diameter thereof decreases in accordance with the curvature Cf from the connection position with the precombustion chamber 3r. For instance, in some embodiments, a precombustion-chamber-side opening end 41s of a specific near nozzle hole 42 which is at least one nozzle hole 4 in the near-ignition region may also have a diameter decreasing in accordance with a curvature Cn from the connection position with the precombustion chamber 3r. In this case, the curvature Cf of the precombustion-chamber-side opening end 41s of the specific far nozzle hole 43 is larger than the curvature Cn of the specific near nozzle hole 42. That is, the inlet pressure loss of the combustion flame produced by ignition by the ignition device 5 is smaller at the precombustion-chamber-side opening end 41s of the specific far nozzle hole 43 than at the precombustion-chamber-side opening end 41s of the specific near nozzle hole 42. This suppresses deceleration of the combustion flame produced by ignition by the ignition device 5 when the combustion flame flows into the precombustion-chamber-side opening end 41s of the specific far nozzle hole 43.

Thereby, it is possible to increase the flow velocity of the torch jet injected to the main combustion chamber 2r from the specific far nozzle hole 43, and thus it is possible to adjust and equalize the flow velocity of the torch jet from the specific far nozzle hole 43 and the flow velocity of the torch jet injected from the specific near nozzle hole 42 to the main combustion chamber 2r. Consequently, it is possible to suppress the variation of flame propagation in the main combustion chamber 2r. Further, by suppressing the variation of flame propagation in the main combustion chamber 2r, it is possible to suppress knocking caused by delay of flame arrival, and it is possible to improve the engine efficiency.

Further, in some embodiments, the specific far nozzle hole 43 may be the farthest nozzle hole 43s. That is, in this case, the precombustion-chamber-side opening end 41s of the farthest nozzle hole 43s has a bell-mouth shape. Thereby, in the precombustion chamber 3r, it is possible to adjust and equalize injection start timing and injection strength of torch jets injected from the nearest nozzle hole 42s which the combustion flame produced by ignition by the ignition device 5 reaches the earliest and the farthest nozzle hole 43s which the combustion flame reaches the latest, and it is possible to efficiently suppress the variation of flame propagation in the main combustion chamber 2r.

The present invention is not limited to the embodiments described above, but includes modifications to the embodiments described above, and embodiments composed of combinations of those embodiments.

For instance, in some embodiments, the precombustion-chamber-side opening end 41s of the specific far nozzle hole 43 in the embodiments relating to connection position between the precombustion-chamber-side opening end 41s of the nozzle hole 4 and the precombustion chamber 3r as shown in FIGS. 1 to 4 or in the embodiments relating to shape of the precombustion chamber 3r as shown in FIGS. 5 to 8 may have a bell-mouth shape.

Further, although in the embodiments shown in FIGS. 1 to 4 and 9, the angle θf of depression of the specific far nozzle hole 43 is equal to the angle θn of depression of the specific near nozzle hole 42 (θn=θf), the present invention is not limited to the present embodiments. In some embodiments, the angle θf of depression of the specific far nozzle hole 43 may not be equal to the angle θn of depression of the specific near nozzle hole 42. Further, although in the embodiments as shown in FIGS. 5 to 8, the angle θf of depression of the specific far nozzle hole 43 is different from the angle θn of depression of the specific near nozzle hole 42 (θn<θf), the present invention is not limited to the present embodiments. In some embodiments, the angle θf of depression of the specific far nozzle hole 43 may be equal to the angle θn of depression of the specific near nozzle hole 42. Here, as the angle θ of depression of the nozzle hole 4 increases, the flame propagation distance of the combustion flame from the main-chamber-side opening end 41m of the nozzle hole 4 to the cylinder wall surface 13w increases, and it takes longer time for flame propagation to the cylinder wall surface 13w. Therefore, in the precombustion chamber 3r, by setting the angle θn of depression of the specific near nozzle hole 42 which the combustion flame produced by ignition of an air-fuel mixture by the ignition device 5 reaches earlier to be larger than the angle θf of depression of the specific far nozzle hole 43 which the combustion flame reaches later, it is possible to adjust and align arrival timing of the combustion flame to the cylinder wall surface 13w, and it is possible to suppress the variation of flame propagation in the main combustion chamber 2r.

REFERENCE SIGNS LIST

1 Precombustion chamber gas engine
11 Cylinder liner
12 Cylinder head
13 Cylinder
13w Cylinder wall surface
14 Piston
15 Intake port
16 Exhaust port
17 Intake valve
18 Exhaust valve
19 Precombustion chamber cap
2 Main-chamber forming portion
2r Main combustion chamber
3 Precombustion-chamber forming portion
3r Precombustion chamber
31 Small-diameter-cylinder forming portion
31r Small-diameter cylinder chamber
33 Large-diameter-cylinder forming portion
33c Constant diameter cylinder portion
33d Enlarged diameter cylinder portion
33r Large-diameter cylinder chamber
35 Bottom portion
36 Outer peripheral surface
37 Inner peripheral surface
4 Nozzle hole
41m Main-chamber-side opening end
41s Precombustion-chamber-side opening end
42 Specific near nozzle hole
42s Nearest nozzle hole
43 Specific far nozzle hole
43s Farthest nozzle hole
5 Ignition device
51 Ignition portion
6 Precombustion-chamber-gas supply device
61 Precombustion-chamber-fuel-gas supply valve
Rf Far-ignition region
Rn Near-ignition region
D predetermined distance between ignition portion and main chamber central axis
Cm Main chamber central axis
Cp Central line of nozzle hole
Cs Precombustion chamber central axis
Ba Reference line
Br Borderline
Lf Nozzle hole length of specific far nozzle hole
Ln Nozzle hole length of specific near nozzle hole df Distance (between main chamber central axis and precombustion-chamber-side opening end of specific far nozzle hole)
dn Distance (between main chamber central axis and precombustion-chamber-side opening end of specific near nozzle hole)
rf Distance (between precombustion chamber central axis and precombustion-chamber-side opening end of specific far nozzle hole)
rn Distance (between precombustion chamber central axis and precombustion-chamber-side opening end of specific near nozzle hole)
Cf Curvature of precombustion-chamber-side opening end of specific far nozzle hole
Cn Curvature of precombustion-chamber-side opening end of specific near nozzle hole

The invention claimed is:

1. A precombustion chamber gas engine comprising:
a main-chamber forming portion forming a main combustion chamber;
precombustion-chamber forming portion forming a precombustion chamber communicating with the main combustion chamber via a plurality of nozzle holes; and
an ignition device disposed at an upper portion of an interior of the precombustion chamber and having an ignition portion spaced from a main chamber central axis of the main combustion chamber at a predetermined distance,
wherein, in a plan view, the precombustion chamber has a near-ignition region in which the ignition portion is disposed and a far-ignition region opposite to the near-ignition region, the near-ignition region and the far-ignition region being separated by a borderline passing through a precombustion chamber central axis of the precombustion chamber and perpendicular to a straight line passing through the precombustion chamber central axis and the ignition portion,
wherein the plurality of nozzle holes includes a specific far nozzle hole which is at least one nozzle hole in the far-ignition region and a specific near nozzle hole which is at least one nozzle hole in the near-ignition region, and a nozzle hole length of the specific far nozzle hole is shorter than a nozzle hole length of the specific near nozzle hole, and
wherein the precombustion chamber is formed so as to deviate the precombustion chamber central axis from the main chamber central axis so that a distance between the main chamber central axis and a precombustion-chamber-side opening end of the specific far nozzle hole is longer than a distance between the main chamber central axis and a precombustion-chamber-side opening end of the specific near nozzle hole in the precombustion-chamber forming portion.

2. The precombustion chamber gas engine according to claim 1,
wherein the specific near nozzle hole includes a nearest nozzle hole closest to the ignition portion among the plurality of nozzle holes in the near-ignition region in a plan view, and
wherein the specific far nozzle hole includes a farthest nozzle hole farthest from the ignition portion among the plurality of nozzle holes in the far-ignition region in a plan view.

3. The precombustion chamber gas engine according to claim 1,
wherein the precombustion chamber is formed so as to deviate the precombustion chamber central axis from the main chamber central axis so that a distance between the main chamber central axis and a precombustion-chamber-side opening end of the specific far nozzle hole is longer than a distance between the main chamber central axis and a precombustion-chamber-side opening end of the specific near nozzle hole in the precombustion-chamber forming portion.

* * * * *